May 13, 1958

D. J. LAMBERT 2,834,152

CONTROL FOR BOAT

Filed Aug. 31, 1956

INVENTOR.
Donald J. Lambert
BY
Ramsey and Kolisch
Attys.

United States Patent Office 2,834,152
Patented May 13, 1958

2,834,152

CONTROL FOR BOAT

Donald J. Lambert, Troutdale, Oreg.

Application August 31, 1956, Serial No. 607,483

5 Claims. (Cl. 46—77)

This invention relates to self-propelled vehicles of the so-called captive type and it relates more particularly to a novel control mechanism for such vehicles.

Captive self-propelled vehicles, such as toy boats, submarines, etc., are commonly steered or otherwise controlled by means of a control system which permits the vehicle to be controlled from a remote position. Such control systems are advantageous since they allow a vehicle to be recovered easily, as the operator may guide the vehicle so as to prevent it from moving to an area where it would be relatively inaccessible. Equally important, however, control systems are employed so that the vehicle may be made to perform various maneuvers and thus more closely resemble its true-to-life counterpart.

To be satisfactory, control systems of this type should detract as little as possible from the over-all appearance of the vehicle used therewith. They should not be subject to becoming tangled or snarled, and should permit positive and accurate control of the vehicle at all times. For example, some of the control systems which have been suggested have not been entirely satisfactory as they require a number of control lines which create an unsightly appearance. In turning and maneuvering the vehicle, the lines tend to become entangled with one another, so that effective control of the vehicle is lost. Control systems known to date are also characterized by the fact that they generally either require two hands to manipulate, or may be handled using one hand only with difficulty.

Generally, it is an object of this invention to provide a control system for captive vehicles which permits the vehicle to be accurately and positively controlled in a highly practical and satisfactory manner.

The control system of this invention includes a regulating mechanism, which is remotely controlled, connected to control parts located in the vehicle itself, the regulating mechanism and control parts operating in conjunction with each other to bring about control of the vehicle. The control parts in the vehicle include a control element and mechanism normally urging the element in one direction. The regulating mechanism provides a means for moving the control element in another direction, so that the regulating mechanism and control parts coact to permit the vehicle to be controlled through movement of the control element in either of two directions.

Another object of this invention is to provide a vehicle having a control element mounted therein and normally urged in one direction, with a regulating mechanism which includes a line connected to the control element which may be readily adjusted so that a controlled amount of tension is developed in the line thereby governing the action of the control element; and to provide such a vehicle with a regulating mechanism wherein the tension is created by engaging a friction clutch having a driven clutch element, the torque being transmitted through the friction clutch creating the developed tension.

These and other objects and advantages are attained by the present invention, various novel features of which will become more fully disclosed as the following description is read in conjunction with the accompanying drawings wherein.

Figure 2:
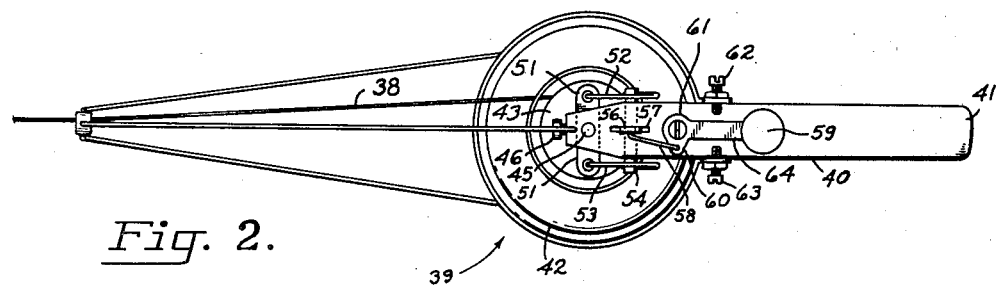
Fig. 2 is a top view of the regulating mechanism shown in Fig. 1.

A toy boat embodying this invention comprises a hull or body 10 having a rudder or steering means 11 forming a control element for the boat and a propeller or propulsion means 12. Propeller 12 is affixed to a shaft 13 extending into the hull of the boat, and suitable mechanism (not shown) is provided for a rotating shaft 13 and the propeller so that the boat is self-propelled. The propeller, for instance, may be spring powered, steam powered, or driven by a gasoline engine as desired.

Rudder 11 is affixed to a shaft 14 which extends vertically upwardly into the hull and is mounted for rotation in sleeve 16 fastened to the interior of the hull. Above the upper end of sleeve 16 and secured to the top of the shaft 14 is a crank member 17. A horizontal pin 18 is placed with its rear end inserted through an offset portion of crank member 17 so that longitudinal movement of pin 18 will pivot crank member 17 and rudder 11.

Located within the hull and forward of the rudder assembly just described is a biasing assembly generally indicated at 19. Biasing assembly 19 includes a dependent bracket 21 having legs 22 fastened to the under side of a plate 23 secured to the hull by means of screws 24. Extending through bracket 21 and rotatably mounted in legs 22 is a rod 26. A pulley 27 is secured to the forward end of rod 26 as by screw 28, and suitably fastened to the rear end of rod 26 is a worm gear 29. Below worm gear 29 and integrally formed to bracket 21 are a pair of parallel extensions 31 (the rear extension is not shown). Extensions 31 have inserted therebetween a pin 32 for rotatably supporting a bevel gear 33 and a lever arm 34. Bevel gear 33 and lever arm are secured together for rotation as a unit about pin 32. Bevel gear 33 meshes with worm gear 29 so that rotation of rod 26 in a clockwise direction looking toward the rear of the boat pivots the outer end of lever arm 34 forwardly, while rotation of rod 26 in the opposite direction pivots the outer end of lever 34 to the rear. Pin 18 has its forward end pivoted in lever arm 34 so that rudder 11 pivots in response to pivotal movement of lever arm 34.

Encircling rod 26 with one of its ends secured to the forward leg 22 of bracket 21 and the other of its ends inserted in a retainer 37 is a coil spring 36. Retainer 37 is secured to rod 26 so as to stress coil spring 36 in a wound position about rod 26, spring 36 tending to rotate shaft 26 in a clockwise direction looking toward the rear of the boat.

Since coil spring 36 is wound about shaft 26 so as to urge rotation of shaft 26 in a clockwise direction looking toward the rear of the boat, the outer end of lever arm 34 tends to be pivoted by the action of the coil spring inwardly toward the forward leg of bracket 22. A regulating means, operatively connected to the rudder assembly through the biasing assembly, is provided for rotating shaft 26 in the opposite direction against the action of the biasing assembly and spring 36. This regulating means includes a line 38, having one of its ends attached to and wrapped around pulley 27, and the other of its ends carried by a portable assembly, generally indicated at 39, wherein a controlled tension may be imparted to line 38.

Figure 1:
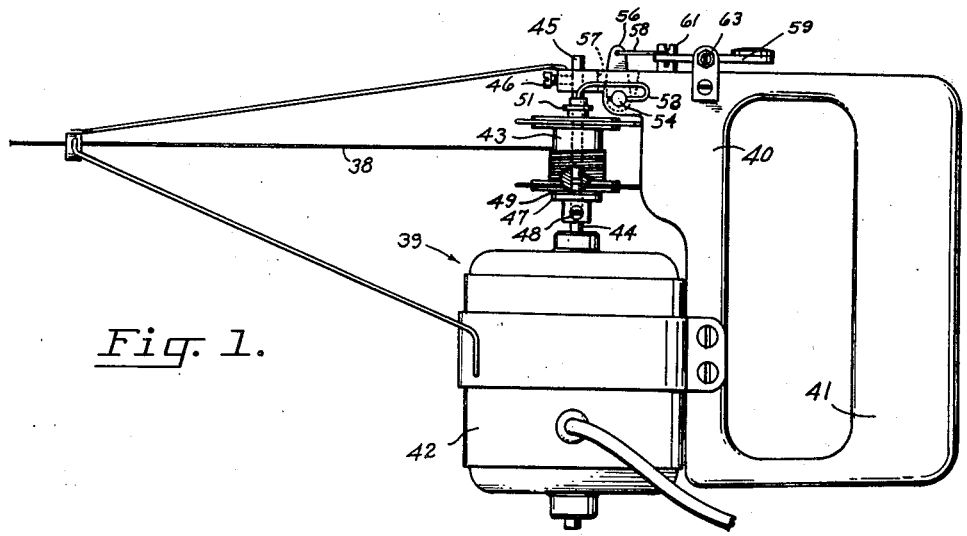
Fig. 1 is a side view of a regulating mechanism embodying this invention.
Figure 3:
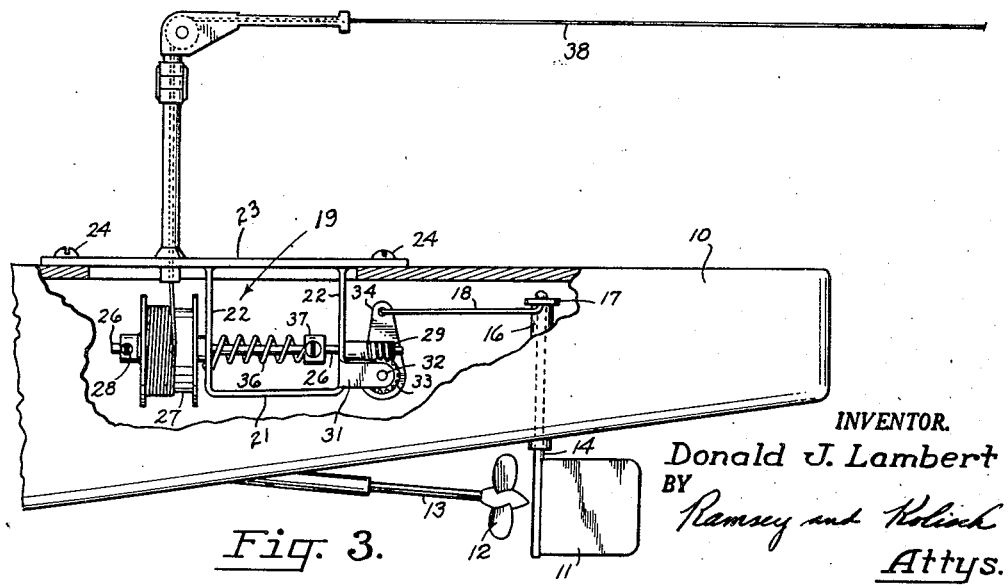
Fig. 3 is a side view, partly broken away, of a boat having a rudder and associated control parts responsive to the regulating mechanism shown in Figs. 1 and 2.

Referring to Figs. 1 and 2, portable assembly 39 comprises a portable mounting 40 having a handle 41, an electric motor 42 mounted on the handle, and a rotatable drum or take-up member 43 adapted to be connected to the motor so that torque will be transmitted from the motor to the drum.

Extending from electric motor 42 is a motor shaft 44. Drum 43 is slidably and rotatably mounted at one of its ends on the butt end of motor shaft 44, which extends a limited distance within drum 43. The other end of drum 43 is slidably and rotatably mounted on a pilot shaft 45, secured to mounting 40 as by screw 46. Interposed between drum 43 and motor 42 is a friction clutch assembly having a driving clutch element or plate 47 fixed to shaft 44 by a screw 48, and a driven clutch element or plate 49 secured to the inner side of drum 43. When drum 43 and plate 49 are urged downwardly in Fig. 1 against driving clutch plate 47, clutch plates 47 and 49 engage each other so that torque is transmitted from the motor 42 to drum 43.

A manually operable control means is provided for adjusting the engagement of the friction clutch assembly. The control means illustrated comprises a bar 51 secured to drum 43 and slidably mounted on pilot shaft 45 between the outer end of drum 43 and mounting 40. A pair of hair springs 52 and 53, disposed on opposite sides of mounting 40, have one of their ends secured to bar 51 and the other of their ends fixed in a pivot rod 54 mounted for pivotal movement in mounting 40. A lever arm 56 attached to pivot rod 54 extends outwardly through a slot 57 which is provided in the mounting to permit lever arm 56 to be moved to the right and left as viewed in Fig. 1. Secured to the outer end of lever arm 56 at one of its ends is a link 58, which has the other of its ends fastened to a lateral extension 60 of a control member 59. Control member 59 is pivotally secured to mounting 40 by pivot connection 61, so that the control member may be pivoted on mounting 40. Adjustable abutment screws 62 and 63 are carried by mounting 40 to either side of a longitudinal extension 64 of control member 59, for limiting the pivotal movement of the control member. When it is desired to engage the friction clutch assembly, control member 59 is pivoted so that the outer end of lateral extension 60 is moved toward pivot shaft 45. This imparts counterclockwise rotation to pivot rod 54 as viewed in Fig. 1, so that hair springs 52, 53 urge bar 51 and drum 43 toward motor 42. Conversely, the friction clutch assembly may be disengaged by pivoting control member 59 so that the outer end of extension 60 moves away from pivot shaft 46. The clockwise rotation imported to rod 54 swings hair springs 52, 53 in a clockwise direction and pulls drum 43 away from motor 42.

The end of line 38 which is carried by portable assembly 39 is secured to drum 43 so that when the drum is rotated the line will be taken up and wrapped about the drum. The rotation of drum 43 in turn is controlled by the engagement of the clutch assembly as described hereinbefore.

In operation, the control mechanism described herein has been found to give accurate control which is readily responsive to the will of the operator. When the control mechanism is used for steering a vehicle, a straight course may be set for the vehicle by adjusting member 59 so that the torque transmitted from motor 42 to rotatable take-up member 43, through clutch elements 47, 49, tensions line 38 against the bias of coil spring 36 sufficiently to move rudder 11 to a position where it is longitudinally aligned with the vehicle. By lessening the engagement of the clutch elements, a greater degree of slip is introduced between the clutch elements so that rudder 11 is pivoted away from this aligned position with the vehicle through the force of coil spring 36. Rudder 11 may be pivoted in the opposite direction by increasing the engagement between the faces of the clutch elements, so that a sufficient tension is created in line 38 to overcome the bias of spring 36.

I claim:

1. Control mechanism for a captive self-propelled vehicle having a body and propulsion means comprising a movable control element mounted in said body for controlling said vehicle, biasing means mounted in said body urging said control element in one direction, and remotely controlled regulating means for moving said control element in another direction against said biasing means, said regulating means comprising a flexible line connected at one end to said control element in said vehicle body, and portable mechanism connected to the other end of said line for varying the tension in said line, said mechanism having a power source, a friction clutch having a rotatable driving element connected to said power source for rotation thereby and a rotatable frictionally engaged driven element, and manually operable control means for adjusting the engagement of said driven element, said line being connected to said portable mechanism through said driven element, engagement of said driven element by said driving element being operable to tension said line and move said control element against said biasing means.

2. Directional control means for a captive self-propelled vehicle having a body, steering means mounted in said body, and propulsion means, said control means comprising biasing means mounted in said body urging said steering means toward one position, and remotely controlled regulating means operatively connected to said steering means for moving said steering means away from said one position against said biasing means, said regulating means including a flexible line connected at one end to said steering means, and portable mechanism connected to the other end of said line for varying the tension in said line, said mechanism having a rotatable take-up member for said line, and tensioning means including a friction clutch operatively connected to said take-up member whereby a controlled tension may be created in said line.

3. Directional control means for a captive self-propelled vehicle having a body, steering means for said body, and propulsion means, said controlled means comprising biasing means mounted in said body urging said steering means toward one position, and remotely controlled regulating means operatively connected to said steering means for moving said steering means away from said one position against said biasing means, said regulating means including a flexible line connected at one end to said steering means, and portable mechanism connected to the other end of said line, said portable mechanism having a rotatable takeup member, said line being connected to said portable mechanism through said take-up member, a power source, and a friction clutch having a driving element connected to said power source and a driven element connected to said rotatable take-up member, whereby a controlled tension may be created in said line.

4. Directional control means for a captive self-propelled vehicle having a body, steering means for said body, and propulsion means comprising, biasing means mounted in said body urging said steering means toward one position, and regulating means operatively connected to said steering means for moving said steering means away from said one position against said biasing means, said regulating means having a rotatable take-up member, a line connected at one of its ends to said steering means and at the other of its ends to said take-up member, a power source, a friction clutch including a driving element connected to said power source and a driven element connected to said rotatable take-up member, and manually operable control means for adjusting the engagement of said driven element by said driving element, whereby a controlled tension may be created in said line.

5. Directional control means for a captive self-propelled vehicle having a body, steering means for said body, and propulsion means comprising, biasing means mounted in said body urging said steering means toward one position, and a remotely controlled regulating means operatively connected to said steering means for moving said steering means away from said one position against said biasing means, said regulating means having a portable mounting, a handle portion for said mounting, a motor, and a rotatable take-up member carried by said mounting, a friction clutch including a driving element connected to said motor and a driven element connected to said rotatable take-up member, manually operable control means for adjusting the engagement of said friction clutch, and a line connected at one of its ends to said steering means and at the other of its ends to said take-up member, a controlled tension being created in said line by adjustment of said friction clutch.

References Cited in the file of this patent

UNITED STATES PATENTS

| | | |
|---|---|---|
| 558,420 | Regan | Apr. 14, 1896 |
| 2,151,724 | Wengel et al. | Mar. 28, 1939 |
| 2,404,922 | Padgett | July 30, 1946 |
| 2,519,472 | Howard | Aug. 22, 1946 |
| 2,559,049 | St. Clair | July 3, 1951 |
| 2,588,891 | Spradlin | Mar. 11, 1952 |
| 2,589,268 | Less | Mar. 18, 1952 |
| 2,694,300 | Cherigie | Nov. 16, 1954 |
| 2,743,068 | Walker | Apr. 24, 1956 |

FOREIGN PATENTS

| | | |
|---|---|---|
| 884,770 | Germany | July 20, 1953 |